United States Patent
Ogino et al.

(10) Patent No.: US 12,358,808 B2
(45) Date of Patent: Jul. 15, 2025

(54) CE—ZR COMPOSITE OXIDE, MANUFACTURING METHOD OF SAME, AND EXHAUST GAS PURIFICATION CATALYST USING SAME

(71) Applicant: UMICORE SHOKUBAI JAPAN CO., LTD., Tokoname (JP)

(72) Inventors: Yuji Ogino, Kobe (JP); Yusuke Haneda, Kobe (JP); Koji Nakagawa, Kobe (JP); Shinji Iwamoto, Kiryu (JP)

(73) Assignee: UMICORE SHOKUBAI JAPAN CO., LTD., Tokoname (JP)

( * ) Notice: Subject to any disclaimer, the term of this patent is extended or adjusted under 35 U.S.C. 154(b) by 398 days.

(21) Appl. No.: 17/790,460

(22) PCT Filed: Apr. 5, 2021

(86) PCT No.: PCT/JP2021/014474
§ 371 (c)(1),
(2) Date: Jun. 30, 2022

(87) PCT Pub. No.: WO2021/220727
PCT Pub. Date: Nov. 4, 2021

(65) Prior Publication Data
US 2023/0058556 A1    Feb. 23, 2023

(30) Foreign Application Priority Data
Apr. 28, 2020   (JP) ................... 2020-078886

(51) Int. Cl.
*B01J 21/06*   (2006.01)
*B01D 53/94*   (2006.01)
(Continued)

(52) U.S. Cl.
CPC ............. *C01G 25/00* (2013.01); *B01D 53/94* (2013.01); *B01J 23/63* (2013.01); *B01J 37/08* (2013.01)

(58) Field of Classification Search
CPC ............. B01J 23/10; B01J 23/63; B01J 37/08
(Continued)

(56) References Cited

U.S. PATENT DOCUMENTS 5,762,894 A * 6/1998 Takatori ................... B01J 23/10
502/302
6,139,814 A * 10/2000 Shigapov ................ C01B 13/14
502/340

(Continued)

FOREIGN PATENT DOCUMENTS

| CN | 1241988 A | 1/2000 |
|---|---|---|
| CN | 101896429 A | 11/2010 |

(Continued)

OTHER PUBLICATIONS

Office Action (The First Office Action) issued on Dec. 26, 2023, by the State Intellectual Property Office of the People's Republic of China in corresponding Chinese Patent Application No. 202180017582.2, and an English Translation of the Office Action. (16 pages).

(Continued)

*Primary Examiner* — Cam N. Nguyen
(74) *Attorney, Agent, or Firm* — Smith, Gambrell & Russell, LLP

(57) ABSTRACT

An object of the present invention is to provide means for releasing oxygen at a temperature lower than conventional means in an exhaust gas purification catalyst. A Ce—Zr composite oxide is provided, which has a crystallite diameter of 6.5 nm or less and a BET specific surface area of 90 m$^2$/g or more.

7 Claims, 3 Drawing Sheets

(51) Int. Cl.
  *B01J 23/10*    (2006.01)
  *B01J 23/63*    (2006.01)
  *B01J 37/08*    (2006.01)
  *C01G 25/00*    (2006.01)

(58) Field of Classification Search
  USPC .......................................... 502/302–304, 349
  See application file for complete search history.

(56) References Cited

U.S. PATENT DOCUMENTS

| | | | |
|---|---|---|---|
| 6,171,572 B1 | 1/2001 | Aozasa | |
| 6,214,306 B1* | 4/2001 | Aubert | C01G 25/02 423/213.2 |
| 7,214,643 B2* | 5/2007 | Yamamoto | C01G 25/00 423/594.2 |
| 7,767,617 B2* | 8/2010 | Larcher | B01J 23/10 502/349 |
| 7,871,956 B2* | 1/2011 | Wakita | B01J 23/63 423/594.12 |
| 7,939,040 B2* | 5/2011 | Larcher | C01G 25/006 423/594.12 |
| 8,460,626 B2* | 6/2013 | Larcher | C01G 25/00 502/170 |
| 9,561,494 B2* | 2/2017 | Kato | B01J 21/066 |
| 9,751,075 B2* | 9/2017 | Nagao | C01G 25/02 |
| 9,931,614 B2* | 4/2018 | Morikawa | B01J 37/16 |
| 10,010,868 B2* | 7/2018 | Shingai | B01J 37/009 |
| 2010/0298127 A1 | 11/2010 | Beppu et al. | |
| 2014/0030158 A1* | 1/2014 | Takagi | B01J 37/0244 502/333 |
| 2014/0050654 A1* | 2/2014 | Hannemann | B01J 35/613 423/579 |
| 2015/0375203 A1* | 12/2015 | Ohtake | B01J 23/10 423/247 |
| 2016/0121302 A1* | 5/2016 | Morikawa | B01J 37/16 502/303 |
| 2016/0250620 A1* | 9/2016 | Morikawa | B01D 53/9445 502/303 |
| 2018/0021759 A1 | 1/2018 | Huang et al. | |

FOREIGN PATENT DOCUMENTS

| | | |
|---|---|---|
| EP | 0414695 A1 | 3/1991 |
| JP | H03504712 A | 10/1991 |
| JP | H04342421 A | 11/1992 |
| JP | H10212122 A | 8/1998 |
| JP | H11217220 A | 8/1999 |
| JP | 2008150237 A | 7/2008 |
| JP | 2013014451 A | 1/2013 |
| JP | 2018506424 A | 3/2018 |

OTHER PUBLICATIONS

International Search Report (PCT/ISA/210) with an English translation, and Written Opinion (PCT/ISA/237) mailed on Jun. 1, 2021, by the Japan Patent Office as the International Searching Authority for International Application No. PCT/JP2021/014474. (14 pages).

Extended European Search Report dated May 7, 2024, issued by the European Patent Office in corresponding European Application No. 21797237.1-1014, (8 pages).

Deng, J. et al. "Designed synthesis and characterization of nanostructured ceria-zirconia based material with enhanced thermal stability and its application in three-way catalysis" Elsevier, Jurnal of Industrial and Engineering Chemistry, vol. 64, 2018, pp. 219-229.

Su, Y et al. "Synthesis of mesoporous cerium-zirconium binary oxide nanoadsorbents by a solvothermal process and their effective adsorption of phosphate from water" Elsevier, Chemical Engineering Journal, vol. 268, 2015, pp. 270-279.

Office Action (Second Examination Opinion Notice) issued on Aug. 19, 2024, by the State Intellectual Property Office in corresponding Chinese Patent Application No. 202180017582.2, and an English Translation of the Office Action. (12 pages).

\* cited by examiner

CE—ZR COMPOSITE OXIDE, MANUFACTURING METHOD OF SAME, AND EXHAUST GAS PURIFICATION CATALYST USING SAME

TECHNICAL FIELD

The present invention relates to a Ce—Zr composite oxide, a manufacturing method of same, and an exhaust gas purification catalyst using same.

BACKGROUND ART

In recent years, regulations on automobile exhaust gas have been tightened. To comply with the tightened regulations, the demand for further improvement in exhaust gas purification performance in exhaust gas purification catalysts has become even stronger. In particular, since it is difficult to implement a reduction of nitrogen oxide (NOx) simultaneously with an oxidation of carbon monoxide (CO) and hydrocarbon (HC), technologies for improving NOx purification performance have been actively developed.

Methods of purifying NOx include a method of direct decomposition from NOx to nitrogen ($N_2$) and a method of reacting NOx with a reducing agent to accomplish a reduction to $N_2$. However, since the former method is extremely difficult to implement, the latter method using a reducing agent is widely used today.

The use of oxygen storage materials is an effective method to purify NOx. For example, it has been reported that zirconia powder in a solid solution with ceria (ceria-zirconia solid solution) is used as an oxygen storage material (Japanese Unexamined Patent Application H10-212122). The ceria-zirconia solid solution according to Japanese Unexamined Patent Application H10-212122 has a high surface area, which increases the amount of oxygen absorption and release (Examples).

SUMMARY OF INVENTION

However, the ceria-zirconia solid solution disclosed in Japanese Unexamined Patent Application H10-212122 has an average particle size of 0.01 μm (10 nm) or more. Such a ceria-zirconia solid solution has inferior oxygen release performance, particularly at low temperatures. Therefore, when such a ceria-zirconia solid solution is used as an exhaust gas purification catalyst, the exhaust gas purification performance thereof is not sufficient, particularly at low temperatures.

Therefore, in view of the foregoing, an object of the present invention is to provide means of releasing oxygen at a temperature lower than conventional means.

Furthermore, another object of the present invention is to provide means of improving exhaust gas purification performance, and particularly exhaust gas purification performance at low temperatures.

A ceria-zirconia composite oxide (Ce—Zr composite oxide) according to one aspect of the present invention has a crystallite diameter of 6.5 nm or less and a BET specific surface area of 90 $m^2$/g or more.

DESCRIPTION OF EMBODIMENTS

Figure 1:
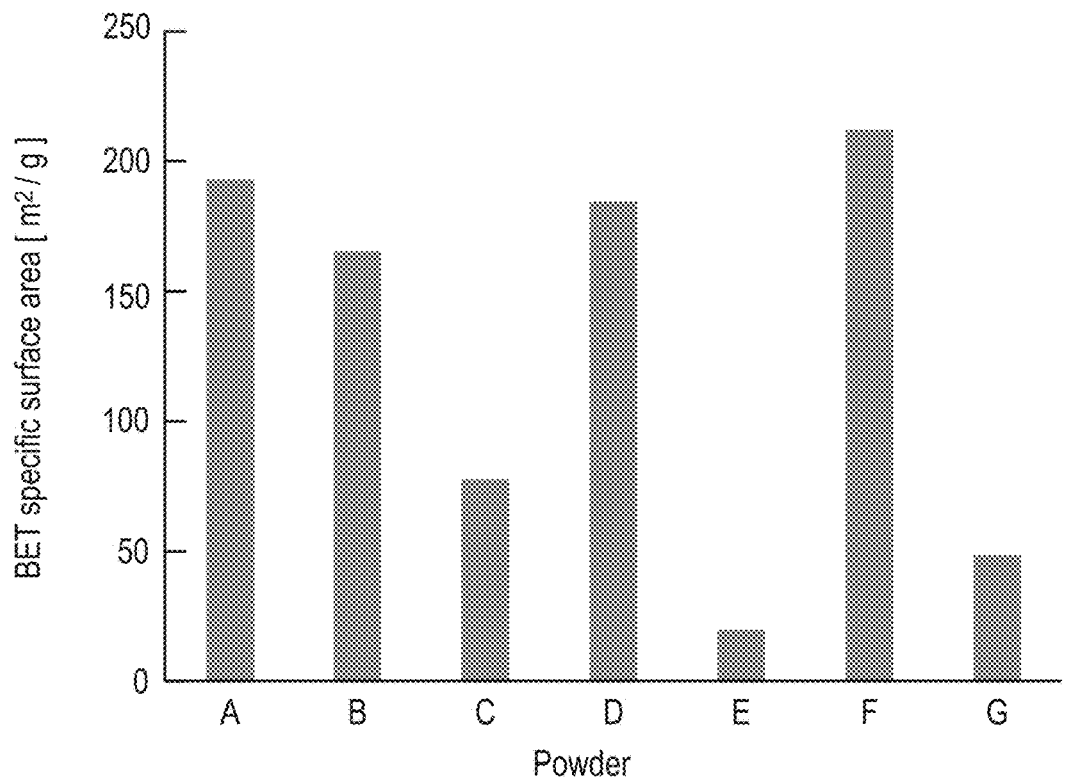
FIG. 1 is a graph showing the BET specific surface areas of powders A to G.

While embodiments of the present invention will be described below, the technical scope of the present invention should be defined based on the description of the claims and is not limited to the following embodiments. Note that a numerical range "A to B" in the present specification includes A and B and means "A or more and B or less." Furthermore, "A and/or B" mean "either one of A or B" or "both A and B."

A Ce—Zr composite oxide according to one aspect of the present invention has a crystallite diameter of 6.5 nm or less and a BET specific surface area of 90 $m^2$/g or more. The Ce—Zr composite oxide with these attributes is capable of releasing oxygen at lower temperatures than conventional oxides. Therefore, a catalyst using the Ce—Zr composite oxide of the present invention has improved exhaust gas purification capabilities.

The present inventors conducted diligent research into the problems to be solved by the present invention described above. As a result, it was discovered that a composite containing Ce and Zr (Ce—Zr composite oxide) having a small crystallite diameter of at most 6.5 nm and a large BET specific surface area of 90 $m^2$/g or more can absorb and release oxygen at lower temperatures than conventional composites, and that a catalyst containing such Ce—Zr composite oxide has excellent exhaust gas purification performance at low temperatures.

Although the reason why the Ce—Zr composite oxide according to the present invention has improved exhaust gas purification performance at low temperatures by having the aforementioned attributes is not certain, the present inventors infer as follows. Note that the present invention is not limited to the following mechanism.

Present Ce—Zr composite oxides have small crystallites and a high specific surface area, and thus a larger exposed area of ceria and zirconia, than the usual Ce—Zr composite oxides having large crystallites and a low specific surface area. Therefore, present Ce—Zr composite oxide has improved contact probability with exhaust gas when exposed to exhaust gas. Therefore, it is considered that the reaction rate of the following formula (1) is increased by the present Ce—Zr composite oxide, and that the oxygen storage and release properties are excellent even at low temperatures.

[Chemical Formula 1]

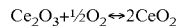  Formula (1)

In the reaction in formula (1) above, the reduction reaction of $CeO_2$ occurs by contacting a reducing agent such as carbon monoxide (CO) or hydrocarbon (HC). Therefore, the Ce—Zr composite oxide having improved contact probability with a gases such as CO or HC has excellent exhaust gas purification performance, including carbon monoxide (CO) and hydrocarbon (HC), in addition to a high oxygen release capability even at low temperatures.

Ce—Zr Composite Oxide

The Ce—Zr composite oxide according to the present invention contains a Ce metal and/or metal oxide and a Zr metal and/or metal oxide. The Ce—Zr composite oxide according to the present invention functions as an oxygen storage material (also referred to as "oxygen storage and release substance") that stores oxygen in an oxidizing atmosphere (lean) and releases oxygen in a reducing atmosphere (rich) in response to fluctuations in the air-fuel ratio (A/F), which changes depending on the driving state, so as to allow oxidation/reduction reactions to proceed stably.

Crystallite Diameter

The Ce—Zr composite oxide according to the present invention has a crystallite diameter of 6.5 nm or less. Herein, when the crystallite diameter exceeds 6.5 nm, the oxygen storage and release performance is reduced. Furthermore, it is difficult or impossible to release oxygen at low temperatures (hence the inferior purification performance of exhaust gases (particularly, CO and HC) at low temperatures). From the perspective of further improving the effect of the oxygen release performance at low temperatures (purification performance of exhaust gases (particularly, CO and HC) at low temperatures), the crystallite diameter of the Ce—Zr composite oxide is preferably less than 6.5 nm, more preferably 5.5 nm or less, and particularly preferably 4.6 nm or less. Note that the smaller the crystallite diameter (microcrystal) of the Ce—Zr composite oxide, the easier it is to release lattice oxygen inside the crystal lattice, and the better the oxygen storage and release properties derived from the cerium can be fully demonstrated. Furthermore, the smaller the crystallite diameter, the easier it is for oxygen conduction to occur, which is preferred. Note that the conduction of oxygen is intended to be the following phenomenon. In other words, the oxygen conduction phenomenon occurs between the surface and the inside of the Ce—Zr composite oxide particles when the gas atmosphere of the exhaust gas changes from lean to rich, or from rich to lean. When the exhaust gas atmosphere changes from lean to rich, the oxygen adsorbed on the Ce (referred to as CeO) near the surface is easily released. Next, the oxygen held by the Ce adjacent to the CeO that released the oxygen and is further towards the inside of the crystal (referred to as Ce1) moves and is conducted to the CeO. Similarly, there is a possibility that further oxygen is in succession conducted from the inside of the crystal by the linked Ce2, Ce3, and Ce4. Furthermore, when the gas atmosphere of the exhaust gas changes from rich to lean, conversely, oxygen in the gas phase is first adsorbed onto CeO, and the adjacent Ce1 takes the oxygen from the CeO, such that CeO can adsorb the next oxygen. The oxygen held by Ce1 is then further taken by Ce2 further inside, resulting in successive oxygen conduction from the surface towards the inside.

It is difficult to cause Ce—Zr composite oxides with a large crystallite diameter to release oxygen at low temperatures because time is required for oxygen to be conducted from deep inside. Therefore, the lower limit of the crystallite diameter is not limited, but is preferably 1.0 nm or more, more preferably 2.0 nm or more, even more preferably 3.0 nm or more, and particularly preferably more than 3.0 nm. In other words, the Ce—Zr composite oxide according to the present invention has a crystallite diameter that is preferably 1.0 nm or more and 6.5 nm or less, more preferably 2.0 nm or more and less than 6.5 nm, even more preferably 3.0 nm or more and 5.5 nm or less, and particularly preferably more than 3.0 nm and 4.6 nm or less.

The crystallite diameter of the Ce—Zr composite oxide can be measured in accordance with a known method such as X-ray diffraction, TEM method, and the like. Note that in the present specification, the crystallite diameter value of the Ce—Zr composite oxide is measured in accordance with the following method.

In the diffraction pattern of XRD (X-ray diffraction), the results of the measurement of the peak at $2\theta=28$ to $30°$ is applied to the following Scherrer's equation to calculate the crystallite diameter of the calculated Ce—Zr composite oxide.

Scherrer's Equation:

$$\text{Crystallite diameter}(nm) = K \times \lambda / \beta \cos \theta \qquad \text{Equation 1}$$

In the aforementioned Scherrer's equation, A represents the X-ray wavelength (nm), $\theta$ represents the diffraction angle ('), K represents the shape factor (constant), and $\beta$ represents the peak width after correcting for the spread of diffraction lines by the device. The measurement procedure is performed in accordance with JIS H 7805:2005.

BET Specific Surface Area

In addition to the above, the Ce—Zr composite oxide according to the present invention has a BET (Brunauer-Emmett-Teller) specific surface area of 90 $m^2/g$ or more. Herein, if the BET specific surface area is less than 90 $m^2/g$, the exposed area of Ce—Zr will be low; thus, the contact probability with exhaust gas is reduced, resulting in insufficient oxygen storage and release properties. Furthermore, precious metals cannot be highly dispersed during catalyst manufacturing. From the perspective of further improving oxygen storage and release properties, obtaining highly dispersed precious metals, and the like, the BET specific surface area of the Ce—Zr composite oxide according to the present invention is preferably 135 $m^2/g$ or more, more preferably 165 $m^2/g$ or more, and particularly preferably 180 $m^2/g$ or more. Note that the larger the BET specific surface area of the Ce—Zr composite oxide, the greater the contact probability with oxygen. Therefore, the upper limit of the BET specific surface area is not particularly limited, but is usually 470 $m^2/g$ or less. If the BET specific surface area exceeds 470 $m^2/g$, the viscosity of the slurry increases, making catalyst preparation difficult, which is not preferred. The BET specific surface area of the Ce—Zr composite oxide according to the present invention is preferably 320 $m^2/g$ or less. In other words, the Ce—Zr composite oxide according to the present invention has a BET specific surface area that is preferably 90 $m^2/g$ or more and 470 $m^2/g$ or less, more preferably 135 $m^2/g$ or more and 320 $m^2/g$ or less, even more preferably 165 $m^2/g$ or more and 320 $m^2/g$ or less, and particularly preferably 180 $m^2/g$ or more and 320 $m^2/g$ or less.

In the present specification, the BET specific surface area value of the Ce—Zr composite oxide is measured in accordance with a BET method using nitrogen as an adsorbed molecule. Specifically, the BET specific surface area ($m^2/g$) is measured using a TriStar II 3020 manufactured by Micromeritics. Furthermore, the BET specific surface area of the Ce—Zr composite oxide is the BET specific surface area of Ce—Zr composite oxide of the final product, and is the "BET specific surface area (after a structure stabilization treatment)" in the Examples below.

R Value

The Ce—Zr composite oxide according to the present invention has the aforementioned crystallite diameter of 6.5 nm or less and BET specific surface area of 90 $m^2/g$ or more, and preferably has the following relationship. In Ce—Zr composite oxides with a large BET specific surface area but large crystallite diameter, or Ce—Zr composite oxides with a small crystallite diameter but small BET specific surface area, sufficient oxygen release does not occur at low temperatures. Due to turbulent diffusion of oxygen molecules caused by the high surface area, the oxygen molecules reach many Ce—Zr composite oxides which have a predetermined crystallite diameter, facilitating the separation of the lattice oxygen inside the crystal from the lattice. Herein, it has been found that the oxygen storage and release properties can be further improved when the value obtained by dividing the BET specific surface area of the Ce—Zr composite oxide by the surface area obtained from the crystallite diameter ($=S/(\pi r^2)$) (S=BET specific surface area (m$^2$/g), r=crystallite diameter (nm)); also referred to as "R value") is within a predetermined range. Specifically, the Ce—Zr composite oxide has an R value of preferably 1.5 or more, more preferably 1.5 or more and 30 or less, even more preferably 2.0 or more and 8.0 or less, and particularly preferably 2.5 or more and 6.6 or less. The Ce—Zr composite oxide having such an R value has a high surface area without aggregating the Ce—Zr composite oxides having a small crystallite diameter. As a result, movement of lattice oxygen inside the crystal (oxygen conduction) is likely to occur even at low temperatures, and high oxygen storage and release properties (hence, exhaust gas purification performance at a lower temperature) can be exhibited.

The Ce—Zr composite oxide according to the present invention indispensably contains a metal and/or metal oxide of Ce (preferably Ce metal oxide (ceria)) and a metal and/or metal oxide of Zr (preferably Zr metal oxide (zirconia)). Herein, the ratio of cerium (Ce) in the Ce—Zr composite oxide is preferably 5 to 80 mass %, and more preferably 20 to 70 mass % as $CeO_2$ with regard to the Ce—Zr composite oxide. Within this range, oxygen in the exhaust gas can be stored. Herein, the ratio of zirconium (Zr) in the Ce—Zr composite oxide is preferably 20 to 95 mass %, and more preferably 30 to 80 mass % as $ZrO_2$ with regard to the Ce—Zr composite oxide. Within this range, oxygen stored in the Ce can be efficiently released.

The Ce—Zr composite oxide according to the present invention may further contain, if necessary, a metal element other than Ce and Zr (hereinafter, also referred to as "other metal element"). The other metal element may be neodymium (Nd), lanthanum (La), praseodymium (Pr), or yttrium (Y). Of these, at least one of Nd, La and Y is preferably included, La or Y is more preferably included, and La is particularly preferably included. Herein, the other metal atoms described above may be present in the form of metals and/or metal oxides, but the metal oxide form is preferred. In other words, in a preferred aspect of the present invention, the Ce—Zr composite oxide according to the present invention is composed of: at least one of cerium and ceria and at least one of zirconium and zirconia; or at least one of cerium and ceria, at least one of zirconium and zirconia, and at least one type of metal selected from a group consisting of neodymium, lanthanum, praseodymium, and yttrium or an oxide of these metals. Note that in the above, "composed of" encompasses "only composed of" and "substantially composed of." Preferably, "composed of" means only "only composed of." Note that in the present specification, "substantially" means that the amount of components other than the specified components is included at a ratio less than 0.5 atom % (lower limit: 0 atom %) with regard to the total number of atoms of the metal elements included in the Ce—Zr composite oxide.

The ratio of neodymium (Nd) in the Ce—Zr composite oxide when the Ce—Zr composite oxide according to the present invention further contains neodymium (Nd) is preferably more than 0 mass % to 15 mass %, and more preferably 2 to 10 mass % as $Nd_2O_3$ with regard to the Ce—Zr composite oxide. Within such a range, a sufficient percentage of the number of Ce and Zr atoms can be ensured, so that excellent oxygen storage and release properties can be achieved.

The ratio of lanthanum (La) in the Ce—Zr composite oxide when the Ce—Zr composite oxide according to the present invention further contains lanthanum (La) is preferably more than 0 mass % to 15 mass %, and more preferably 2 to 10 mass % as $La_2O_3$ with regard to the Ce—Zr composite oxide. Within such a range, a sufficient percentage of the number of Ce and Zr atoms can be ensured, so that excellent oxygen storage and release properties can be achieved and thermal stability of the Ce—Zr composite oxide can be further improved.

The ratio of praseodymium (Pr) in the Ce—Zr composite oxide when the Ce—Zr composite oxide according to the present invention further contains praseodymium (Pr) is preferably more than 0 mass % to 15 mass %, and more preferably 2 to 10 mass % as $Pr_2O_3$ with regard to the Ce—Zr composite oxide. Within such a range, a sufficient percentage of the number of Ce and Zr atoms can be ensured, so that excellent oxygen storage and release properties can be achieved.

The ratio of yttrium (Y) in the Ce—Zr composite oxide when the Ce—Zr composite oxide according to the present invention further contains yttrium (Y) is preferably more than 0 mass % to 15 mass %, and more preferably more than 0 mass % to 10 mass % as $Y_2O_3$ with regard to total number of atoms of metal elements included in the Ce—Zr composite oxide. Within such a range, a sufficient percentage of the number of Ce and Zr atoms can be ensured, so that excellent oxygen storage and release properties can be achieved.

Note that in the present specification, the amount (mass %) of each element in the composite is calculated from the results of XRF analysis based on the following method.

XRF Analysis

The Ce—Zr composite oxide was milled with a disc mill, and pressed by a pressing machine to have a circular plate shape with a diameter of 31 mm and a thickness of 5 mm, which was used as a sample. An XRF analysis was performed on the sample using S8 TIGER (wavelength dispersion type, Rh tube) manufactured by BRUKER ANALYTIK. From the obtained spectrum the ratio of atoms (atom %) with the total number of atoms of Ce and Zr and the other components (neodymium, lanthanum, praseodymium and yttrium) (that is, all metal elements) being 100% is calculated.

Examples of the crystal structure of the Ce—Zr composite oxide include cubic, tetragonal, monoclinic and orthorhombic crystals and the like, but is preferably cubic, tetragonal or monoclinic, and more preferably cubic or tetragonal.

The Ce—Zr composite oxide according to the present invention is manufactured by using a solvothermal method at a specific temperature and performing a surface stabilization treatment and then performing a structure stabilization treatment. Specifically, a cerium compound, a zirconium compound, and, if necessary, a compound containing at least one type of metal selected from a group consisting of neodymium, lanthanum, praseodymium, and yttrium are mixed to obtain a mixture. The mixture is solvothermally treated at a temperature exceeding 250° C. to obtain a solvothermally treated product. The solvothermally treated product is treated for surface stabilization at a temperature of 220° C. or higher and less than 380° C. to obtain a precursor.

The precursor is then treated for structure stabilization at a temperature of 380° C. or higher to generate a Ce—Zr composite oxide.

In other words, another aspect of the present invention provides a method of manufacturing a Ce—Zr composite oxide, including the steps of: mixing a cerium compound and a zirconium compound to obtain a mixture; subjecting the mixture to solvothermal treatment at a temperature exceeding 250° C. to obtain a solvothermally treated product; subjecting the solvothermally treated product to surface stabilization treatment at a temperature of 220° C. or higher and less than 380° C. to obtain a precursor; and then subjecting the precursor to structure stabilization treatment at a temperature of 380° C. or higher to create a Ce—Zr composite oxide.

Furthermore, in a more preferred aspect of the present invention, a method of manufacturing a Ce—Zr composite oxide is provided, which includes the steps of: mixing a cerium compound, a zirconium compound, and a compound containing at least one type of metal selected from a group consisting of neodymium, lanthanum, praseodymium, and yttrium to obtain a mixture; subjecting the mixture to solvothermal treatment at a temperature exceeding 250° C. to obtain a solvothermally treated product; subjecting the solvothermally treated product to surface stabilization treatment at a temperature of 220° C. or higher and less than 380° C. to obtain a precursor; and subjecting the precursor to structure stabilization treatment+at a temperature of 380° C. or higher to create a Ce—Zr composite oxide.

Each of the steps is described in order below. Note that the method according to the other aspect and further aspect described above may or may not only stipulate that the Ce—Zr composite oxide contains another metallic element. Therefore, hereinafter, overlapping matters will be described collectively.

Step (I)

First, a cerium compound serving as a Ce raw material, a zirconium compound serving as a Zr raw material and, if necessary, another metal element raw material are mixed, preferably in a solvent (step (I)).

Herein, the cerium compound described above is not particularly limited, but a compound that dissolves in a solvent is preferred. Specific examples include: cerium chloride and other halides; cerium (I) nitrate (cerium nitrate), cerium sulfate, and other inorganic salts; cerium acetate, cerium (III) 2-ethylhexanoate, and other carboxylates; cerium hydroxide; complex compounds in which a ligand such as acetylacetone or alkoxide (methoxide, ethoxide, tert-butoxide, and the like) is coordinated with cerium (for example, cerium (III) triacetylacetonate); and the like. Of these, cerium nitrate and cerium (III) triacetylacetonate are preferred. Only one kind of these cerium compounds may be used alone, or two or more kinds thereof may be used in combination. Furthermore, these cerium compounds may be in the form of a hydrate. The amount of the cerium compound added is not particularly limited, but is preferably such that the amount is a ratio of the number of atoms of Ce in the Ce—Zr composite oxide described above. Furthermore, as these cerium compounds, synthetic compounds or commercially available products may be used.

The zirconium compound described above is not particularly limited, but a compound that dissolves in a solvent is preferred. Specific examples include: zirconium (IV) chloride, zirconium (III) chloride, zirconium oxychloride, zirconium dialkoxydichloride, and other halides; zirconium nitrate, zirconium nitrate, zirconium sulfate, zirconium sulfate, and other inorganic salts; zirconium acetate and zirconium 2-ethylhexanoate, and other carboxylates; zirconium hydride; zirconium tetra-n-propoxide, zirconium tetra-isopropoxide, zirconium tetraethoxydo, zirconium tetra-n-butoxide, and other tetraalkoxyzirconium; complex compounds in which a ligand such as acetylacetone or alkoxide (methoxide, ethoxide, tert-butoxide, and the like) is coordinated with zirconium (for example, zirconium acetylacetonate, tetrakis (acetylacetonate) zirconium, tetrakis (diethylmalonate) zirconium, tetrakis (acetylacetone) zirconium); and the like. Of these, zirconium tetra-n-propoxide and zirconium acetylacetonate are preferable. Only one kind of these zirconium compounds may be used alone, or two or more kinds thereof may be used in combination. Furthermore, these zirconium compounds may be in the form of a hydrate. The amount of the zirconium compound added is not particularly limited, but is preferably such that the amount is a ratio of the number of atoms of Zr in the Ce—Zr composite oxide described above. Furthermore, as these zirconium compounds, synthetic compounds or commercially available products may be used.

When the Ce—Zr composite oxide contains another metal element, the other metal raw material is not particularly limited, but those that are soluble in a solvent are preferable. Specific examples include: nitrates (such as lanthanum nitrate, yttrium nitrate), phosphates (such as lanthanum phosphate), and other inorganic salts of the other metal element; halides (such as lanthanum chloride, yttrium chloride); acetates (such as lanthanum acetate, yttrium acetate) and other carboxylates; hydroxides (such as lanthanum hydroxide, yttrium hydroxide); complex compounds in which a ligand such as acetylacetone or alkoxide (methoxide, ethoxyoxide, tert-butoxide, and the like) is coordinated with the other metal element (such as lanthanum acetylacetonate, yttrium acetylacetonate); lanthanum 2-ethylhexanoate and yttrium 2-ethylhexanoate; and the like. Of these, complex compounds in which acetylacetone is coordinated with the other metal element (such as lanthanum acetylacetonate and yttrium acetylacetonate) are preferable, and lanthanum acetylacetonate and yttrium acetylacetonate are more preferable. Only one kind of these other metal raw materials may be used alone, or two or more kinds thereof may be used in combination. Furthermore, these other metal raw materials may be in the form of a hydrate. The amount of the other metal raw materials added is not particularly limited, but is preferably such that the amount is a ratio of the number of atoms of each of the other metal elements in the Ce—Zr composite oxide described above. Furthermore, as these other metal raw materials, synthetic compounds or commercially available products may be used.

The mixing ratio of the cerium compound, the zirconium compound and the other metal raw material is not particularly limited, and is preferably appropriately selected such that the composition of the Ce—Zr composite oxide is as described above.

The solvent is not particularly limited so long as the cerium compound, the zirconium compound and, when added, the other metal raw material can be dissolved or suspended therein, but a solvent capable of dissolving these is preferable. Specific examples include 1,4-butanediol, octanol, glycerin and other alcohols, ethylene glycol monomethyl ether and other alkylene glycol monoalkyl ethers, and the like. Only one kind of these solvents may be used alone, or two or more kinds thereof may be used in combination. Of these, 1,4-butanediol and octanol are preferable, and 1,4-butanediol is more preferable.

The amount of the solvent used is not particularly limited so long as the cerium compound, the zirconium compound and, if necessary, the other metal raw material can be dissolved and the following solvothermal treatment can proceed. Specifically, the solid content concentration (total weight of the cerium compound, the zirconium compound and, if necessary, the other metal raw material in 100 mL of the solvent) is 0.01 to 5 g/100 mL of solvent, and is preferably 0.1 to 3 g/100 mL of solvent.

Step (II)

The mixture obtained in the aforementioned step (I) is subjected to a solvothermal treatment (treatment based on a solvothermal method) to obtain a solvothermally treated product. Herein, the solvothermal treatment is performed in the same manner as in a conventionally known method or appropriately modified except for the reaction (heating) temperature. The solvothermal treatment is preferably performed in a closed system (for example, in an autoclave). Furthermore, the solvothermal treatment is preferably performed in an atmosphere substituted with an inert gas (such as nitrogen gas, argon gas, helium gas, and the like). In other words, in a preferred aspect of the present invention, the solvothermal treatment is performed in a closed system with an inert gas.

The reaction temperature in the solvothermal treatment exceeds 250° C. Herein, when the reaction temperature is 250° C. or lower, the solvent binds to a solute such as cerium (Ce), zirconium (Zr), or the like as a ligand. Therefore, due to the repulsion between ligands with the same polarity, an aggregation reaction between Ce and Zr (and, if included, with the other metal element) does not proceed. On the other hand, at a temperature higher than 250° C., the ligand separates from the solute (Ce, Zr, and the like), and therefore, the aggregation reaction of Ce and Zr (and, if included, with the other metal element) proceeds. Therefore, in the method according to the present invention, when the solvothermal treatment is performed at a temperature exceeding 250° C., the crystallite diameter of the Ce—Zr composite oxide of a final product can be as small as 6.5 nm or less and the BET specific surface area thereof can be as large as 90 m²/g or more.

The aforementioned reaction is particularly suitable when 1,4-butanediol is used as a solvent. Note that the aforementioned mechanism is an assumption, and the present invention is not limited by the aforementioned assumption. From the perspective of aggregation reaction efficiency of Ce and Zr (and, if included, the other metal element) (hence, further reduction of the crystallite diameter and further increase of the BET specific surface area), the reaction temperature in the solvothermal treatment is preferably 255° C. or higher and 500° C. or lower, more preferably 270° C. or higher and 400° C. or lower, and particularly preferably more than 300° C. and 350° C. or lower. The solvothermal treatment conditions other than the aforementioned temperature are not particularly limited so long as the aggregation reaction between Ce and Zr (and, if included, with the other metal element) proceeds. The reaction pressure is preferably 1 MPa or more and 30 MPa or less, and more preferably 5 MPa or more and 15 MPa or less. The reaction time is preferably 30 minutes or more and 15 hours or less, and more preferably 1 hour or more and 4 hours or less.

After the solvothermal treatment, the reactant (aggregate) is formed as a precipitate. The reactant (aggregate) is separated by a known method such as centrifugation, filtration, or the like.

Step (III)

The solvothermally treated product obtained in step (II) above is surface stabilized at a temperature of 220° C. or higher and lower than 380° C. to obtain a precursor. By performing a surface stabilization treatment, it becomes possible to burn the low-temperature combusting organic components (organic component having a boiling point of 220° C. or higher and lower than 380° C.) mainly in the solvent component, except for nitric radicals. Furthermore, by performing the surface stabilization treatment, the surface of the Ce—Zr composite oxide becomes an oxide and is stabilized in a state with a crystallite diameter of 6.5 nm or less. When only the later described structure stabilization treatment is performed without performing the surface stabilization treatment, it is difficult to obtain a Ce—Zr composite oxide having a crystallite diameter of 6.5 nm or less and a high BET specific surface area of 90 m²/g or more. This is considered to occur because when only the structure stabilization treatment is performed without the surface stabilization treatment, stabilization of oxides on the surface and combustion of internal low-temperature combusting organic materials, high-temperature combusting organic materials (organic component having a boiling point temperature above 380° C.), and nitric radicals occurs at the same time; therefore, crystals grow at the same time due to the heat and flame generated at the time of the combustion. Herein, when the surface stabilization treatment temperature is lower than 220° C., solvent components of 220° C. or higher and lower than 380° C. remain on the precursor, and these remaining solvents burn in the structure stabilization treatment, which is a subsequent step. As a result, the crystallite diameter increases during the structure stabilization treatment, which is not preferable. Furthermore, when the surface stabilization treatment temperature is 380° C. or higher, not only the solvent components of 220° C. or higher and lower than 380° C. but also organic components and the like in the catalyst component raw material burn at the same time and generate heat, which is not preferable. Furthermore, from the perspective of aggregation reaction efficiency of Ce and Zr (and, if included, the other metal element) (hence, further reduction of the crystallite diameter and further increase of the BET specific surface area), the surface stabilization treatment temperature is preferably 230° C. or higher and lower than 370° C., and more preferably 240° C. or higher and lower than 350° C. Furthermore, the surface stabilization treatment time is not particularly limited, but from the perspective of aggregation reaction efficiency of Ce and Zr (and, if included, the other metal element) (hence, further reduction of the crystallite diameter and further increase of the BET specific surface area), the time is preferably 10 minutes or more and 5 hours or less, and more preferably 20 minutes or more and 2 hours or less. Note that the surface stabilization treatment may be performed in any atmosphere, such as air, oxygen gas, a mixture of oxygen gas and inert gas (for example, nitrogen gas and argon gas), and the like. Note that the solvothermal treatment in step (II) and the surface stabilization treatment in step (III) overlap in heat treatment temperature, but the solvothermal treatment is performed under pressure, and the surface stabilization treatment is performed under atmospheric pressure. Therefore, these treatments are different.

Herein, the BET specific surface area of the precursor after the surface stabilization treatment is preferably 155 m²/g or more, more preferably 160 m²/g or more, and particularly preferably 170 m²/g or more. When the BET specific surface area after the surface stabilization treatment is within the range above, a high BET specific surface area can be maintained even after the structure stabilization treatment, which is preferable. Note that a higher BET specific surface area of the precursor after the surface stabilization treatment is preferable. Therefore, the upper limit is not particularly limited, but it is usually approximately 350 m²/g or less, preferably approximately 300 m²/g or less, and more preferably approximately 250 m²/g or less.

Step (IV)

The precursor obtained in the step (III) above is subjected to the structure stabilization treatment at a temperature of 380° C. or higher. The structure stabilization treatment is performed in order to enhance the structural stability of the Ce—Zr composite oxide whose surface is stabilized by oxides, obtained by the surface stabilization treatment. By performing the structure stabilization treatment, any organic components derived from raw materials remaining inside the Ce—Zr composite oxide are burned off and removed, and a solid solution of $CeO_2$ and $ZrO_2$ is promoted to enhance the structural stability. Thus, it is possible to obtain a Ce—Zr composite oxide that satisfies both a crystallite diameter of 6.5 nm or less and a high BET specific surface area of 90 m²/g or more.

Herein, if the temperature of the structure stabilization treatment is lower than 380° C., a portion of the organic component derived from the raw materials remains even after the structure stabilization treatment; therefore reducing the performance of the Ce—Zr composite oxide by caulking or the like, which is not preferable. From the perspective of aggregation reaction efficiency of Ce and Zr (and, if included, the other metal element) (hence, further reduction of the crystallite diameter and further increase of the BET specific surface area), removal of organic components, and the like, the structure stabilization treatment temperature is preferably 380° C. or higher and lower than 950° C., and more preferably 400° C. or higher and lower than 800° C. Furthermore, the structure stabilization treatment time is not particularly limited, but from the perspective of aggregation reaction efficiency of Ce and Zr (and, if included, the other metal element) (hence, further reduction of the crystallite diameter and further increase of the BET specific surface area), removal of organic components, and the like, the time is preferably 15 minutes or more and 10 hours or less, more preferably 30 minutes or more and 5 hours or less, and even more preferably 1 hour or more and 3 hour or less.

Note that the structure stabilization treatment may be performed in any atmosphere, such as air, oxygen gas, a mixture of oxygen gas and inert gas (for example, nitrogen gas and argon gas), and the like.

In the Ce—Zr composite oxide of the present invention, the ratio of the BET specific surface area after the structure stabilization treatment to the BET specific surface area after the surface stabilization treatment is preferably 0.54 or more and 1.0 or less, more preferably 0.8 or more and 0.98 or less, even more preferably 0.9 or more and 0.95 or less, and particularly preferably 0.90 or more and 0.95 or less.

In other words, in a preferred aspect of the present invention, the BET specific surface area of the precursor obtained by the surface stabilization treatment is 155 m²/g or more, and the ratio of the BET specific surface area of the Ce—Zr composite oxide after the structure stabilization treatment to the BET specific surface area of the precursor after the surface stabilization treatment is 0.54 or more and 1.0 or less. In a more preferred aspect of the present invention, the BET specific surface area of the precursor obtained by the surface stabilization treatment is 160 m²/g or more, and the ratio of the BET specific surface area of the Ce—Zr composite oxide after the structure stabilization treatment to the BET specific surface area of the precursor after the surface stabilization treatment is 0.8 or more and 0.98 or less. In a particularly preferred aspect of the present invention, the BET specific surface area of the precursor obtained by the surface stabilization treatment is 170 m²/g or more, and the ratio of the BET specific surface area of the Ce—Zr composite oxide after the structure stabilization treatment to the BET specific surface area of the precursor after the surface stabilization treatment is 0.9 or more and 0.95 or less (particularly 0.90 or more and 0.95 or less).

In the present specification, the BET specific surface area of the Ce—Zr composite oxide is a value measured in accordance with a BET method using nitrogen as an adsorbed molecule. Specifically, the BET specific surface area (m²/g) is measured using a TriStar II 3020 manufactured by Micromeritics.

The Ce—Zr composite oxide according to the present invention is manufactured by the aforementioned method. The Ce—Zr composite oxide according to the present invention has excellent oxygen storage and release properties even at low temperatures. Therefore, the Ce—Zr composite oxide according to the present invention can be used as an oxygen storage material (OSC material) in an exhaust gas purification catalyst. In other words, according to another aspect of the present invention, an exhaust gas purification catalyst is provided, in which precious metal and the Ce—Zr composite oxide according to the present invention are supported on a three-dimensional structure. The aspect will be described below. Note that the exhaust gas purification catalyst according to the aspect above (hereinafter, also simply referred to as "catalyst") is not limited except that the Ce—Zr composite oxide according to the present invention is included, and a conventionally known component and technique can be applied. Therefore, the present invention is not limited to the following.

The catalyst according to the present invention indispensably contains the Ce—Zr composite oxide according to the present invention. Herein, the amount of the Ce—Zr composite oxide (supported amount; in terms of oxide) is not particularly limited, but the amount is preferably 5 to 200 g, more preferably 5 to 100 g, and even more preferably 10 to 90 g per liter of the three-dimensional structure. By including the Ce—Zr composite oxide at such an amount, an oxidation/reduction reaction can be stably promoted.

(Precious Metal)

The catalyst according to the present invention indispensably contains a precious metal (catalyst component). The precious metal (catalyst component) exhibits catalytic properties in an oxidation/reduction reaction for purifying exhaust gas. Here, the type of the precious metal is not particularly limited, however, specific examples thereof include platinum (Pt), palladium (Pd), and rhodium (Rh). These precious metals may be used alone, or two or more types thereof may be used in combination. Of these, the precious metal is preferably platinum, palladium, and rhodium, more preferably platinum alone or a combination of platinum and/or palladium and rhodium, and particularly preferably palladium alone or a combination of palladium and rhodium. Namely, according to a preferable mode of the present invention, the precious metal is at least one type selected from the group consisting of platinum, palladium, and rhodium. Furthermore, according to a more preferable aspect of the present invention, the precious metal is preferably palladium only, or at least one of platinum and palladium along with rhodium. According to a particularly preferable aspect of the present invention, the precious metal is palladium, or palladium and rhodium.

Here, the amount of platinum (Pt) that is used (supported amount) is not particularly limited, however, taking into consideration the exhaust gas purification properties, the amount is preferably from 0.01 to 20 g, more preferably from 0.05 to 10 g, and most preferably greater than 0.5 g and less than 5 g in terms of precious metal per 1 liter of the three-dimensional structure.

The amount of palladium (Pd) that is used (supported amount) is not particularly limited, however, taking into consideration the exhaust gas (in particular, HC) purification properties, the amount is preferably from 0.01 to 20 g, more preferably from 0.05 to 5 g, and most preferably from 0.3 to 3 g in terms of precious metal per 1 liter of the three-dimensional structure.

The amount of rhodium (Rh) that is used (supported amount) is not particularly limited, however, taking into consideration the exhaust gas (in particular, NOx) purification properties, the amount is preferably from 0.01 to 20 g, more preferably from 0.05 to 5 g, and most preferably from 0.1 to 3 g in terms of precious metal per 1 liter of the three-dimensional structure.

In addition, when the precious metals are platinum and palladium, the mixing ratio of platinum and palladium (platinum:palladium (mass ratio)) is preferably from 50:1 to 1:1, from 40:1 to 1:1, from 30:1 to 1.1:1, from 20:1 to 1.3:1, or from 5:1 to 1.5:1 in this order. The exhaust gas purification efficiency can be improved when the range of the mixing ratio of platinum and palladium falls within the preferable range described above.

In addition, when the precious metals are palladium and rhodium, the mixing ratio of palladium and rhodium (palladium:rhodium (mass ratio)) is preferably from 30:1 to 1.1:1, more preferably from 20:1 to 1.3:1, and particularly preferably from 5:1 to 1.5:1. The exhaust gas purification efficiency can be improved when the range of the mixing ratio of palladium and rhodium falls within the preferable range described above.

The precious metal precursor (precious metal starting material) is not particularly restricted, and starting materials used in this field such as water-soluble precious metal salts and precious metal complexes can be used. These may be modified and used in accordance with the method of preparing the catalyst. Specific examples of raw materials of palladium (Pd) (palladium sources) include: halides such as palladium chloride; inorganic salts of palladium such as nitrates, sulfates, acetates, ammonium salts, amine salts, tetraammine salts, hexaammine salts, carbonates, bicarbonates, nitrites, and oxalates; carboxylates of palladium such as formates; hydroxides, alkoxides, and oxides of palladium; and the like. Of these, nitrates (palladium nitrate), tetraammine salts (tetraammine palladium), hexaammine salts (hexaammine palladium), carboxylates, and hydroxides are preferable, and nitrates are more preferable. Note that, in the present invention, the palladium precursor may be a single precursor or a mixture of two or more types. Examples of raw materials of rhodium (Rh) (rhodium sources) include: inorganic salts of rhodium such as ammonium salts, amine salts, hexaammine salts, carbonates, bicarbonates, nitrates, nitrites, and oxalates; carboxylates of rhodium such as formates; hydroxides, alkoxides, and oxides of rhodium; and the like. Among the same, nitrates, ammonium salts, amine salts, hexaammine salts, and carbonates are preferable. Note that, in the present invention, the rhodium source may be a single source or a mixture of two or more kinds. Examples of raw materials of platinum (Pt) (platinum sources) include: halides such as platinum bromide and platinum chloride; inorganic salts of platinum such as nitrates, dinitrodiamine salts, tetraammine salts, hexaammine salts, sulfates, ammonium salts, amine salts, bis-ethanolamine salts, bis-acetylacetonate salts, carbonates, bicarbonates, nitrites, and oxalates; carboxylates of platinum such as formates; hydroxides, alkoxides, hexahydroxo acid salts, and oxides of platinum; and the like. Among the same, nitrates (platinum nitrate), dinitrodiammine salts (dinitrodiammine platinum), chlorides (platinum chloride), tetraammine salts (tetraammine platinum), hexaammine salts (hexaammine platinum), and hexahydroxo acid salts are preferable. Note that, in the present invention, the platinum precursor may be a single precursor or a mixture of two or more types.

The amount of the precious metal source is not particularly limited, however, an amount that allows the content (supported amount) of each precious metal described above to be achieved is preferable. Note that when two or more types of precious metal precursors are used in combination, the total amount of the precious metal precursors is preferably an amount that allows the contents (supported amount) of the precious metals described above to be achieved.

(Refractory Inorganic Oxide)

The catalyst according to the present invention may contain a refractory inorganic oxide in addition to or in place of the precious metal. Refractory inorganic oxides can be used as a carrier supporting a catalytically active component such as a precious metal, rare earth metal, another metal element, and the like. The refractory inorganic oxide is not particularly limited so long as the oxide is usually used as a catalyst carrier. Furthermore, the refractory inorganic oxide has a high specific surface area where the catalyst component can be supported, such that the contact area between the catalyst component and the exhaust gas can be increased, and reactants can be adsorbed. As a result, reactivity of the entire catalyst can be further increased.

Examples of the refractory inorganic oxide include alumina, zeolite, titania, zirconia, silica, and the like. One type of refractory inorganic oxide may be used alone, or two or more types thereof may be used in combination. Of these, alumina and zirconia are preferable from the perspective of high-temperature durability and high specific surface area, and alumina is more preferable. The alumina preferably used as refractory inorganic oxide is not particularly limited so long as an oxide of aluminum is included, and examples thereof include activated alumina such as $\gamma$-, $\delta$-, $\eta$-, and $\theta$-alumina, lanthana-containing alumina, silica-containing alumina, silica-titania-containing alumina, silica-titania-zirconia-containing alumina, and the like. One type of alumina may be used alone, or two or more types thereof may be used in combination. Among the same, $\gamma$, $\delta$, or $\theta$-alumina and lanthana-containing alumina are preferable from the perspective of high-temperature durability and high specific surface area.

Furthermore, the BET specific surface area of the refractory inorganic oxide is not particularly limited, but from the perspective of supporting the catalyst component, the BET specific surface area is preferably from 50 to 750 $m^2/g$, more preferably from 80 to 500 $m^2/g$, and particularly preferably from 120 to 250 $m^2/g$. With this specific surface area, a sufficient amount of the precious metal (catalyst component) can be supported on the refractory inorganic oxide, making it possible to increase the contact area between the catalyst components and the exhaust gas and to adsorb reactants. As a result, reactivity of the entire catalyst can be further increased.

The amount (supported amount) of the refractory inorganic oxide is not particularly limited, but the amount is preferably from 10 to 300 g, and more preferably from 30 to 200 g per 1 L of the three-dimensional structure. When the amount of the refractory inorganic oxide per 1 liter of the three-dimensional structure is 10 g or more, precious metal can be sufficiently dispersed in the refractory inorganic oxide, and a catalyst that is more sufficiently durable can be obtained. On the other hand, when the amount of the refractory inorganic oxide is 300 g or less per 1 L of the three-dimensional structure, the contact between the precious metal and the exhaust gas is improved, and exhaust gas purification performance can be more sufficiently exhibited. Furthermore, when the catalyst according to the present invention contains the refractory inorganic oxide and the Ce—Zr composite oxide according to the present invention, the mixing ratio (mass ratio) of the Ce—Zr composite oxide and the refractory inorganic oxide is preferably 1:0.2 to 9, more preferably 1:0.8 to 5. With such a ratio, a sufficient amount of the precious metal (catalyst component) can be supported on the refractory inorganic oxide, which makes it possible to increase the contact area between the catalyst components and the exhaust gas and allows the Ce—Zr composite oxide to sufficiently demonstrate oxygen storage and release properties and sufficiently adsorb the hydrocarbons (HC), carbon monoxide, and nitrogen oxides (NOx) in the exhaust gas. As a result, the reactivity of the entire catalyst can be further increased, and the exhaust gas purification performance can be further increased.

Rare Earth Elements

The catalyst according to the present invention may further contain rare earth metal other than the Ce—Zr composite oxide. Herein, the rare earth metal is not particularly limited, but examples thereof include lanthanum (La), neodymium (Nd), yttrium (Y), scandium (Sc), praseodymium (Pr), and the like. Of these, lanthanum, neodymium, yttrium, and praseodymium are preferable, and lanthanum and praseodymium are more preferable. The rare earth metal may be contained alone, or two or more types thereof may be contained in combination. In addition, the rare earth metal may be in the form of a metal, or may be in the form of an oxide.

The amount (in terms of oxide) of the rare earth metal is 0.2 to 30 g, and more preferably 0.3 to 10 g, per 1 L of the three-dimensional structure.

Other Components

The catalyst according to the present invention may further contain another component. Herein, the other component is not particularly limited, but Group 2 elements such as magnesium (Mg), calcium (Ca), strontium (Sr), barium (Ba), and the like can be used. These elements may be included in the exhaust gas purification catalyst in the form of an oxide, a sulfate, or a carbonate. Of these, Ba or Sr is preferably used, and strontium oxide, barium sulfate ($BaSO_4$) or barium oxide (BaO) is more preferably used. One type of this other component may be used alone, or two or more types thereof may be used in combination.

When the catalyst according to the present invention contains another component the amount (in terms of oxide) of the other component (in particular, SrO, $BaSO_4$ or BaO) is preferably 0 to 50 g, more preferably 0.1 to 30 g, and even more preferably 0.5 to 20 g, per 1 liter of the three-dimensional structure.

Three-Dimensional Structure

The catalyst according to the present invention has the precious metal and the Ce—Zr composite oxide according to the present invention supported on a three-dimensional structure.

Here, the three-dimensional structure is not particularly restricted, and a refractory three-dimensional structure that is ordinarily used in this field can be similarly used. As the three-dimensional structure, for example, a refractory carrier such as a honeycomb carrier, having channels (gas passage holes, cell shapes) of a triangular shape, a rectangular shape, or a hexagonal shape, can be used. The three-dimensional structure is preferably an integrally molded structure (three-dimensional integral structure, integral weir structure). For example, a monolith carrier, a metal honeycomb carrier, a perforated metal, or the like may be preferably used.

These monolith carriers are produced using an extrusion molding method, a method of winding and solidifying a sheet-like element, or the like. The shape of the channels (gas passage holes, cell shapes) may be hexagonal (honeycomb), rectangular, triangular, or corrugated (corrugation shape). The channels can be adequately used as long as the cell density (number of cells/unit cross-sectional area) is from 100 to 1200 cells/square inch, and the cell density is preferably from 200 to 900 cells/square inch, more preferably from 200 to 600 cells/square inch, and even more preferably from 250 to 500 cells/square inch (1 inch=25.4 mm).

A preferred aspect of a method of manufacturing a catalyst of the present invention will be described below. However, the present invention is not limited to the following preferred aspect.

In other words, the Ce—Zr composite oxide according to the present invention, a precious metal source, if necessary, other components described above (for example, refractory inorganic oxide, rare earth metal, and other components), and an aqueous medium are appropriately weighed and mixed based on a desired composition, and then stirred at 5 to 95° C. for 0.5 to 24 hours (if necessary, stirred and then wet-milled) to prepare a slurry. Herein, as an aqueous medium, for example, water (purified water, ultrapure water, deionized water, distilled water, or the like), a lower alcohol such as ethanol or 2-propanol, an organic alkaline aqueous solution, or the like can be used. Among these, water or a lower alcohol is preferably used, and water is more preferably used. The amount of the aqueous medium is not particularly limited, however, the amount is preferably such that the ratio of solid content in the slurry (solid content mass concentration) is 5 to 60 mass % and more preferably 10 to 50 mass %. The ratio of solid content can be calculated by placing the aforementioned slurry in a crucible, and comparing the ratio of the mass of solid content remaining after removing a solvent component in air at 550° C. for 30 minutes to the mass of the slurry before removing the solvent component in air at 550° C. for 30 minutes.

Herein, the order of adding the Ce—Zr composite oxide, precious metal source, and another raw material (for example, refractory inorganic oxides, rare earth metals, and other components) is not limited, and these may be added to an aqueous medium either as a batch or separately in an appropriate order. Furthermore, the pH of the mixture (slurry) after each raw material is added is preferably adjusted to 1 to 12, and preferably 3 to 9. Therefore, if the pH of the mixture (slurry) after each addition step is out of the range above, a hydrochloric acid, sulfuric acid, nitric acid, carbonic acid, or other acid, or ammonia, sodium hydroxide, potassium hydroxide, sodium carbonate, potassium carbonate, or other base is preferably used to adjust the pH to the aforementioned predetermined range.

Next, the slurry prepared above is applied to the three-dimensional structure. A known method such as a wash coating method or the like may be appropriately used as the method for applying the slurry to the three-dimensional structure. The applied amount of slurry may be appropriately set by a person skilled in the art according to the amount of solid matter in the slurry and the thickness of the catalyst layer to be formed. The amount of slurry applied is preferably such that each component will be at the amounts (supported amount) described above.

Next, a three-dimensional structure coated with the slurry described above is dried in air for 5 minutes to 10 hours, preferably 15 minutes to 3 hours at a temperature of preferably 50 to 170° C., and more preferably 70 to 150° C. Next, the dried slurry coating film (catalyst precursor layer) obtained thereby is calcined in air for 10 minutes to 3 hours, preferably 15 minutes to 1 hour at a temperature of 440° C. to 800° C., preferably 450° C. to 610° C., and more preferably 450° C. to 555° C. Under such conditions, the catalyst components (precious metal, Ce—Zr composite oxide, and the like) can be efficiently adhered to (supported on) the three-dimensional structure. Furthermore, the calcination process is preferably performed while circulating a gas such as air or the like. Here, the rate at which the gas is circulated (gas flow rate) is not particularly restricted but is preferably not less than 0.1 m/sec and more preferably 0.2 to 1.2 m/sec. Note that the catalyst layer forming step may be performed once or multiple times (two or more catalyst layers may be formed on the three-dimensional structure).

The catalyst of the present invention can be produced as described above. Note that as described above, the catalyst according to the present invention may have only one catalyst layer or a structure where two or more catalyst layers are laminated, so long as the Ce—Zr composite oxide according to the present invention is provided. When the catalyst of the present invention has a structure where two or more catalyst layers are laminated, the Ce—Zr composite oxide according to the present invention may be disposed in any catalyst layer. Preferably, the Ce—Zr composite oxide according to the present invention is disposed in a layer containing at least palladium. With such an arrangement, the ability of the Ce—Zr composite oxide according to the present invention can be maximized. Furthermore, the other catalyst layer not containing the Ce—Zr composite oxide according to the present invention is not particularly limited and may be a catalyst layer known in the catalyst field. For example, the same configuration (component) as described above can be used except for not using the Ce—Zr composite oxide according to the present invention. Furthermore, the configuration (components) in each catalyst layer may be the same, but the configuration is preferably different. In the case of precious metals, although not limited to the following, examples of preferred combinations of precious metals in the two catalyst layers (described as a combination of a precious metal in a lower catalyst layer and a precious metal in an upper catalyst layer) include a combination of platinum and rhodium, and combination of palladium and rhodium, combination of platinum and palladium with rhodium, combination of platinum with rhodium and palladium, combination of palladium with rhodium and platinum, and the like. This combination allows for efficient exhaust gas purification. Of these, the combination of platinum and rhodium and the combination of palladium and rhodium are more preferable. Note that it is not necessary that all the catalyst layers contain a precious metal, but all catalyst layers preferably contain a precious metal. Thereby, the catalyst performance can be further improved.

Exhaust Gas Purification Method

The catalyst of the present invention can demonstrate high purification performance with regard to exhaust gas (hydrocarbons (HC), carbon monoxide (CO), and nitrogen oxides (NOx)) even at low temperatures. Therefore, the present invention also provides a method of purifying exhaust gas, which includes treatment (particularly, purifying hydrocarbons (HC), carbon monoxide (CO) and nitrogen oxides (NOx) in the exhaust gas) using an exhaust gas purification catalyst according to the present invention. Note that the catalyst according to the present invention can be applied to exhaust gas from both a gasoline engine and a diesel engine, but can be particularly preferably used for exhaust gas from a gasoline engine. Note that the exhaust gas purification rate (purification performance) can be evaluated using a gasoline engine, based on the temperature (T50 (° C.)) when the purification rate for each of CO, THC, and NOx reaches 50% in a light-off (LO) test described below, for example. Note that a lower T50 value indicates that the catalyst exhibits higher exhaust gas purification performance.

Exhaust gas ordinarily contains HC, CO, and NOx. For example, exhaust gas contains nitrogen oxides (for example, NO, NO2, and N2O), carbon monoxide (CO), carbon dioxide (CO2), oxygen (O2), hydrogen (H2), ammonia (NH3), water (H2O), sulfur dioxide (SO2), hydrocarbons (HC), and the like at given ratios.

The gasoline engines to which the exhaust gas purification method of the present invention is applied are intended emphasize differences from diesel engines, and include, in addition to ordinary gasoline engines, gasoline hybrid engines and engines which use natural gas, ethanol, dimethyl ether, or the like as fuel, for example. Among the same, a gasoline engine is preferable.

An example of the method for bringing the exhaust gas into contact with the catalyst of the present invention is a method of installing the exhaust gas purification catalyst in the exhaust passage of the exhaust port of a gasoline engine and circulating exhaust gas into the exhaust passage.

The catalyst according to the present invention can demonstrate high exhaust gas purification performance even in a low temperature range, but the temperature of the exhaust gas may be 0° C. to 800° C., in other words, within an exhaust gas temperature range during normal gasoline engine operation. Herein, the air-fuel ratio (A/F) in the exhaust gas of a gasoline engine having a temperature of 0° C. to 800° C. is 10 to 30, and preferably 11.0 to 14.7.

An example of the method for bringing the exhaust gas into contact with the catalyst of the present invention is a method of installing the exhaust gas purification catalyst in the exhaust passage of the exhaust port of a gasoline engine and circulating exhaust gas into the exhaust passage.

The catalyst according to the present invention can demonstrate high exhaust gas purification performance even in a low temperature range. Specifically, the catalyst according to the present invention can demonstrate an excellent exhaust gas treatment effect for low temperature exhaust gas (in particular, including HC, CO, NOx, water vapor, and the like) of 50 to 600° C. (in particular, 100 to 500° C.) or low temperature exhaust gas of 50 to 600° C. (in particular, 100 to 500° C.) after having been exposed to high temperature exhaust gas (in particular, including HC, CO, NOx, water vapor, and the like) with a catalyst bed temperature of 650 to 900° C. for a long period of time. Furthermore, the catalyst according to the present invention can demonstrate high purification performance even in a high temperature range of 800 to 1200° C. in addition to the low temperature region as described above. Here, the air-fuel ratio in the exhaust gas of an internal combustion engine having a temperature of 800 to 1200° C. is preferably 10 to 18.6.

Therefore, the catalyst of the present invention described above or a catalyst manufactured by the method described above may be exposed to exhaust gas having a temperature of 800 to 1200° C., and preferably 900 to 1000° C. Further, the amount of time that the catalyst of the present invention is exposed to high temperature exhaust gas (amount of time that the exhaust gas is allowed to flow) is also not particularly limited but is, for example, 10 to 800 hours, preferably 16 to 500 hours, and more preferably 40 to 100 hours. Even after being exposed to such a high temperature exhaust gas, the catalyst of the present invention has high performance. In order to investigate the exhaust gas purification performance of the catalyst after being exposed to high-temperature exhaust gas in this manner, it is effective to subject the catalyst to treatment involving exposure to exhaust gas at 900 to 1000° C. for 10 to 300 hours as thermal aging and to then evaluate the exhaust gas purification performance (resistance to catalyst deterioration).

Note that in the present specification, the "temperature of the exhaust gas" refers to the temperature of the exhaust gas at the catalyst inlet. Here, the "catalyst inlet" refers to a portion extending 10 cm from the catalyst end face on the exhaust gas inlet side toward the internal combustion engine side in the exhaust pipe in which the exhaust gas purification catalyst is installed, and also refers to the location of the center portion in the longitudinal direction (axial direction) of the exhaust pipe. In addition, in the present specification, the "catalyst bed" refers to a center portion between the catalyst end face on the exhaust gas inlet side and the catalyst end face on the exhaust gas outlet side in the exhaust pipe, and also refers to the location of the center portion of a cross section of the exhaust pipe (when the cross section of the exhaust pipe is not circular, this is the location of the center of gravity of the cross section of the exhaust pipe).

Furthermore, although the catalyst of the present aspect can independently demonstrate sufficient catalytic activity, a similar or different exhaust gas purification catalyst may be placed at the front (inflow side) or the rear (outflow side) of the catalyst according to the present invention. Preferably, the catalyst according to the present invention is placed alone, or placed at both the front (inflow side) and the rear (outflow side). Alternatively, the catalyst of the present invention is placed at either the front (inflow side) or the rear (outflow side) and a conventionally known exhaust gas purification catalyst is placed on the other side. More preferably, the catalyst of the present invention is placed alone, or placed at both the front (inflow side) and the rear (outflow side).

EXAMPLES

The present invention will be further specifically described below using examples and comparative examples, but the present invention is not limited to these following examples. Note that unless otherwise specified, each operation was performed under room temperature conditions (25° C.)/relative humidity 40 to 50% RH. In addition, unless otherwise specified, ratios represent mass ratios.

Example 1

Cerium acetate 1.5 hydrate as a Ce raw material, zirconium tetra-n-propoxide as a Zr raw material, and lanthanum acetylacetonate dihydrate as an La raw material were each weighed such that the composition ratio (mass ratio) of $CeO_2:ZrO_2:La_2O_3$ matched the values in Table 1. Each raw material was introduced into a container with 400 mL of 1,4-butanediol as a solvent, and then stirred by a three-one motor for 10 minutes to obtain a mixture (solid content concentration=1.5 g/100 mL of 1,4-butanediol). The mixture was moved to an autoclave (manufactured by Nitto Koatsu, product name: NU-4), and the obtained mixture was stirred at 340° C. for 2 hours in an $N_2$-substituted autoclave (reaction pressure=10.3 MPa) (solvothermal treatment). The obtained product was separated by a centrifuge and surface stabilized in air at 250° C. for 30 minutes to obtain a precursor A'. The BET specific surface area of the precursor A' obtained herein was measured. Note that TriStar II 3020 manufactured by Micromeritics was used for measuring the BET specific surface area. The results are shown under the "BET specific surface area (after surface stabilization treatment)" in Table 2 below.

Next, the obtained precursor A' was structurally stabilized in air at 500° C. for 1 hour to obtain a powder A. Powder A obtained thereby is a Ce—Zr—La composite oxide containing cerium, zirconium and lanthanum at 47:47:6 (mass ratio of $CeO_2:ZrO_2:La_2O_3$) [Ce:Zr:La (atomic ratio)=40:57:3].

Example 2

Powder B was obtained in the same manner as in Example 1 except that the mixture in Example 1 was stirred at 300° C. for 2 hours in an $N_2$-substituted autoclave (solvothermal treatment). Note that in the present example, the BET specific surface area of the precursor (precursor B') after the surface stabilization treatment was also measured in the same manner as in Example 1, and the results are shown under "BET specific surface area (after surface stabilization treatment)" in Table 2 below.

Comparative Example 1

Powder C was obtained in the same manner as in Example 1 except that the mixture in Example 1 was stirred at 250° C. for 2 hours in an $N_2$-substituted autoclave (solvothermal treatment). Note that in the present example, the BET specific surface area of the precursor (precursor C') after the surface stabilization treatment was also measured in the same manner as in Example 1, and the results are shown under "BET specific surface area (after surface stabilization treatment)" in Table 2 below.

Example 3

Powder D was obtained in the same manner as in Example 1 except that zirconium acetylacetonate was used as a raw material for Zr. Note that in the present example, the BET specific surface area of the precursor (precursor D') after the surface stabilization treatment was also measured in the same manner as in Example 1, and the results are shown under "BET specific surface area (after surface stabilization treatment)" in Table 2 below.

Comparative Example 2

Powder E was obtained in the same manner as in Example 3 except that the mixture in Example 3 was stirred at 200° C. for 2 hours in an $N_2$-substituted autoclave (solvothermal treatment). Note that in the present example, the BET specific surface area of the precursor (precursor E') after the surface stabilization treatment was also measured in the same manner as in Example 1, and the results are shown under "BET specific surface area (after surface stabilization treatment)" in Table 2 below.

Example 4

Powder F was obtained in the same manner as in Example 3 except that cerium (III) triacetylacetonate dihydrate was used instead as the Ce raw material. Note that in the present example, the BET specific surface area of the precursor (precursor F') after the surface stabilization treatment was also measured in the same manner as in Example 1, and the results are shown under "BET specific surface area (after surface stabilization treatment)" in Table 2 below.

Comparative Example 3

Cerium nitrate as a Ce raw material, zirconium nitrate as a Zr raw material, and lanthanum nitrate as an La raw material were each weighed such that the composition ratio (mass ratio) of $CeO_2:ZrO_2:La_2O_3$ matched the values in Table 1. Each raw material was introduced into a container with 500 mL distilled water, and then stirred by a three-one motor for 10 minutes. Ammonia was added to the stirred solution such that the pH was 10, and cerium hydroxide, zirconium hydride and lanthanum hydroxide were coprecipitated. The obtained product was centrifuged at 3500 rpm for 10 minutes using a centrifuge. After removing the supernatant, water was added to wash the product and then centrifuged at 3500 rpm for 10 minutes. The aforementioned washing and centrifugation operations were repeated a total of 3 times to obtain the product. The obtained product was dried in air at 250° C. for 30 minutes and then structurally stabilized in air at 500° C. for 1 hour to obtain a powder G.

TABLE 1

| Powder | Composition ratio of each powder after structure stabilization treatment[mass %] | | |
|---|---|---|---|
| | $CeO_2$ | $ZrO_2$ | $La_2O_3$ |
| A | 47 | 47 | 6 |
| B | 47 | 47 | 6 |
| C | 47 | 47 | 6 |
| D | 47 | 47 | 6 |
| E | 47 | 47 | 6 |
| F | 47 | 47 | 6 |
| G | 47 | 47 | 6 |
| H | 30 | 64 | 6 |
| I | 30 | 64 | 6 |
| J | 64 | 30 | 6 |
| K | 64 | 30 | 6 |

The BET specific surface area was measured for the powders A to G obtained above. Note that TriStar II 3020 manufactured by Micromeritics was used for measuring the BET specific surface area. The results are shown in FIG. 1 and under the "BET specific surface area (after structure stabilization treatment)" in Table 2 below. Table 2 and FIG. 1 show that the BET specific surface areas of powders A, B, D, and F with synthesis (solvothermal treatment) temperatures higher than 250° C. are higher than those of comparative powders C (solvothermal method with synthesis temperature of 250° C.), E (solvothermal method with synthesis temperature of 200° C.), and G (coprecipitation method) of the Comparative Examples.

Example 5

Powder H was obtained in the same manner as in Example 3 except for weighing such that the composition ratio (mass ratio) of $CeO_2:ZrO_2:La_2O_3$ matched the values in Table 1. Powder H obtained thereby is a Ce—Zr—La composite oxide containing cerium, zirconium and lanthanum at 30:64:6 (mass ratio of $CeO_2:ZrO_2:La_2O_3$) [Ce:Zr:La (atomic ratio)=24:73:3].

Comparative Example 4

Powder I was obtained in the same manner as in Comparative Example 3 except for weighing such that the composition ratio (mass ratio) of $CeO_2:ZrO_2:La_2O_3$ matched the values in Table 1.

Figure 2:
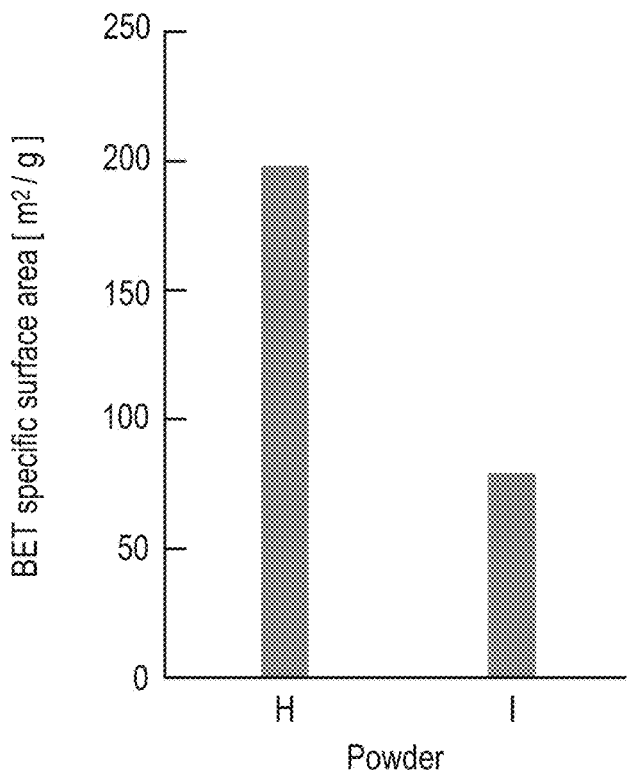
FIG. 2 is a graph showing the BET specific surface areas of powders H and I.

For powders H and I obtained above, the BET specific surface area was measured in the same manner as above. The results are shown in FIG. 2 and under the "BET specific surface area (after structure stabilization treatment)" in Table 2 below. FIG. 2 shows that the powder H manufactured by the solvothermal method has a larger BET specific surface area than the powder I manufactured by the coprecipitation method.

Example 6

A powder J was obtained in the same manner as in Example 3 except for weighing such that the composition ratio (mass ratio) of $CeO_2:ZrO_2:La_2O_3$ matched the values in Table 1. The powder J obtained thereby is a Ce—Zr—La composite oxide containing cerium, zirconium and lanthanum at 64:30:6 (mass ratio of $CeO_2:ZrO_2:La_2O_3$) [Ce:Zr:La (atomic ratio)=59:38:3].

Comparative Example 5

A powder K was obtained in the same manner as in Comparative Example 3 except for weighing such that the composition ratio (mass ratio) of $CeO_2:ZrO_2:La_2O_3$ was the values in Table 1.

Figure 3:
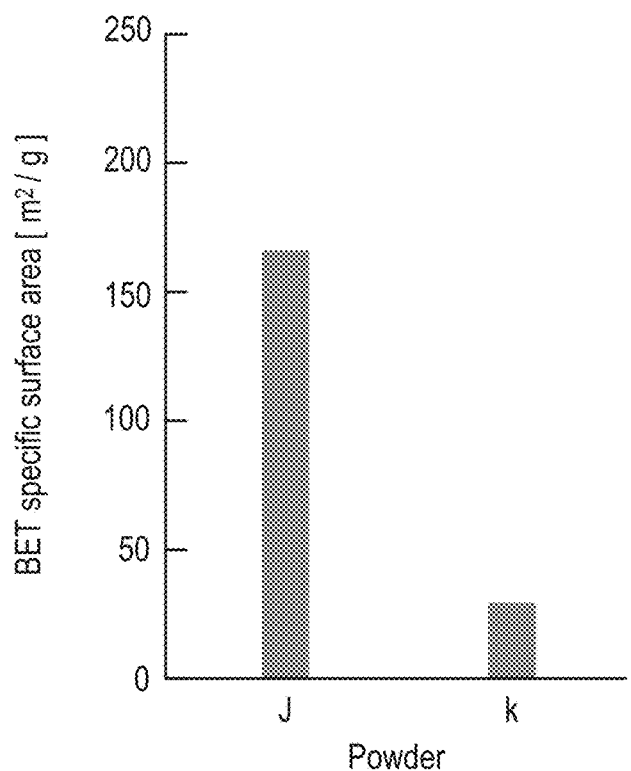
FIG. 3 is a graph showing the BET specific surface areas of powders J and K.

For powders J and K obtained above, the BET specific surface area was measured in the same manner as above. The results are shown in FIG. 3 and under the "BET specific surface area (after structure stabilization treatment)" in Table 2 below. FIG. 3 shows that powder J manufactured by the solvothermal method has a larger BET specific surface area than powder K manufactured by the coprecipitation method.

Furthermore, a XRD measurement was performed for each of powders A to K, and the crystallite diameter (nm) was measured. X'Pert Pro manufactured by Spectris Co., Ltd. was used for these measurements, and a copper tube was used as an X-ray tube. The X-ray wavelength A was 1.54056 Å and K was 0.9. Furthermore, the R value was calculated from the obtained crystallite diameter. The results are shown in Table 2 below.

TABLE 2

Crystallite size and R value of each powder

| Powder | BET specific surface area (After surface stabilization treatment) [m²/g] | BET specific surface area (After structure stabilization treatment) [m²/g] | Crystallite diameter [nm] | Ratio of BET specific surface area after structure stabilization treatment to BET specific surface area after surface stabilization treatment | R Value |
|---|---|---|---|---|---|
| A | 215 | 191 | 4.5 | 0.89 | 3.0 |
| B | 301 | 165 | 5.2 | 0.55 | 2.0 |
| C | 292 | 77 | 4.7 | 0.26 | 1.1 |
| D | 199 | 183 | 4.3 | 0.92 | 3.2 |
| E | 94 | 22 | 3.1 | 0.23 | 0.7 |
| F | 221 | 210 | 4.5 | 0.95 | 3.4 |
| G | 145 | 48 | 14.1 | 0.33 | 0.1 |
| H | 216 | 198 | 3.1 | 0.92 | 6.6 |
| I | 152 | 80 | 10.0 | 0.53 | 0.3 |
| J | 181 | 165 | 4.2 | 0.91 | 2.9 |
| K | 118 | 29 | 7.1 | 0.25 | 0.2 |

Figure 4:
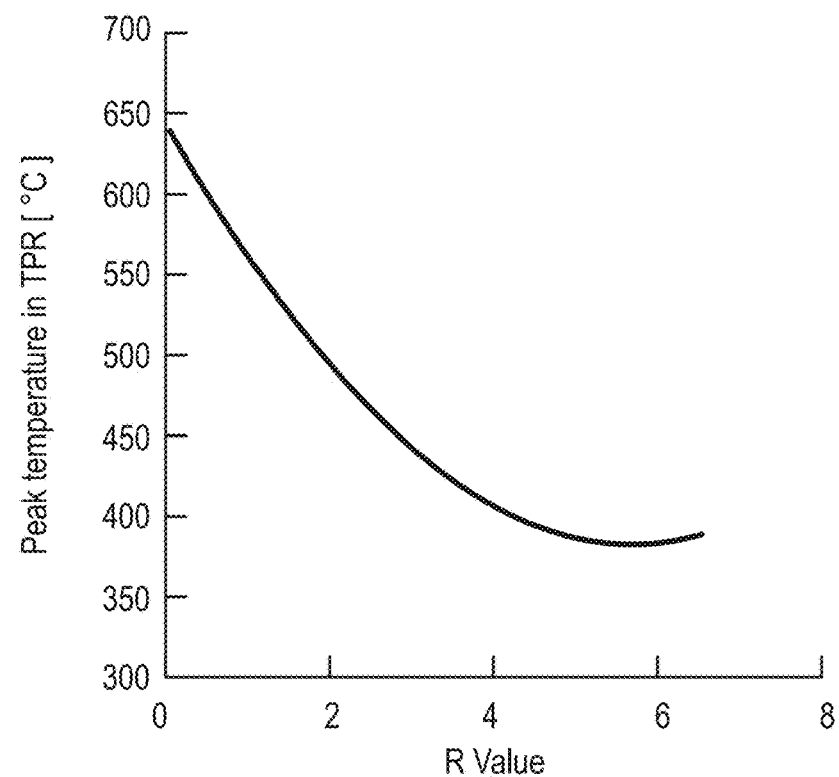
FIG. 4 is a graph showing the relationship between the R value and the peak temperature during $H_2$-TPR measurement.

Furthermore, $H_2$-TPR measurement was performed for powders A, D, G, H, I, and K. For the measurement, a fully automatic catalyst gas adsorption amount measuring device "R-6015" (manufactured by HEMMI Slide Rule Co., Ltd.) was used. Specifically, 0.5 g of each powder was oxidized at 500° C. for 10 minutes under an oxygen gas ($O_2$) flow. Thereafter, the temperature was lowered to room temperature (25° C.), and excess 02 remaining in the device was sufficiently purged by circulating helium gas (He) for 15 minutes. Thereafter, it was switched to He circulation containing 5% $H_2$ and the temperature was increased to 700° C. The $H_2O$ generation properties during the temperature increase were continuously measured with a TCD (thermal conductivity detector). From the obtained $H_2O$ generation curve, the temperature at which most $H_2O$ was generated was calculated as the $H_2O$ generation peak temperature ("Peak temperature in TPR [° C.]" in FIG. 4). FIG. 4 shows the relationship between the peak temperature ("Peak temperature in TPR [° C.]" in FIG. 4) in the $H_2$-TPR measurement in relation to the R value of each powder.

Example 7

Palladium nitrate as a Pd raw material, powder A obtained in Example 1, alumina (average secondary particle size: 25 μm, BET specific surface area: 150 m²/g), strontium hydroxide, and lanthanum acetate were each weighed such that the composition ratio (mass ratio) of Pd:powder A:alumina:SrO:$La_2O_3$ was 1:50:50:9:2. A predetermined amount of palladium nitrate, powder A, alumina, strontium hydroxide and lanthanum acetate were introduced to 300 mL of distilled water, and then stirred by a three-one motor for 1 hour. After adjusting the pH to 6 with nitric acid, wet milling was performed with a ball mill to obtain a slurry (solid content mass concentration=40 mass %). At this time, the particle size (D50) of the slurry was 5 μm. Next, the obtained slurry was wash coated such that the mass after calcining on a cordierite carrier (cylindrical with a diameter of 24 mm and length of 67 mm, 400 cells/square inch, wall thickness of 2.5 milli-inches) was 112 g per 1 liter of three-dimensional structure. Next, a catalyst M was obtained by drying in air at 150° C. for 1 hour and then calcining in air at 550° C. for 30 minutes.

Comparative Example 6

Catalyst N was obtained in the same manner as in Example 7 except that powder G was used instead of powder A.

The exhaust gas purification performance of the exhaust gas purification catalysts M and N manufactured above was evaluated in accordance with the following method.

Thermal Aging Treatment

Each exhaust gas purification catalyst was placed 25 cm downstream from the exhaust port of a V-type, 8-cylinder, 4.6-liter gasoline engine. The following cycle was repeated, namely running the engine such that the temperature of the catalyst bed portion is 960° C., running the engine such that the A/F of the catalyst inlet portion is 14.6, and then stopping the fuel supply such that the A/F becomes 13.0. Based on this cycle, the thermal aging treatment was performed on each of the exhaust gas purification catalysts for a total of 50 hours.

Evaluation of Exhaust Gas Purification Performance

The exhaust gas purification catalysts after the thermal aging treatment were each installed 30 cm downstream of an exhaust port of an inline 6-cylinder, 2.4-liter gasoline engine. The engine was ran such that the A/F at the catalyst inlet was 14.6, and exhaust gas was circulated through the catalyst while the catalyst inlet temperature was raised from 100° C. to 500° C. at a rate of 50° C. per minute. The gas discharged from the catalyst outlet was analyzed to calculate respective purification rates of CO, HC, and NOx, and a temperature at which each purification rate reached 50% was defined as T50.

Figure 5:
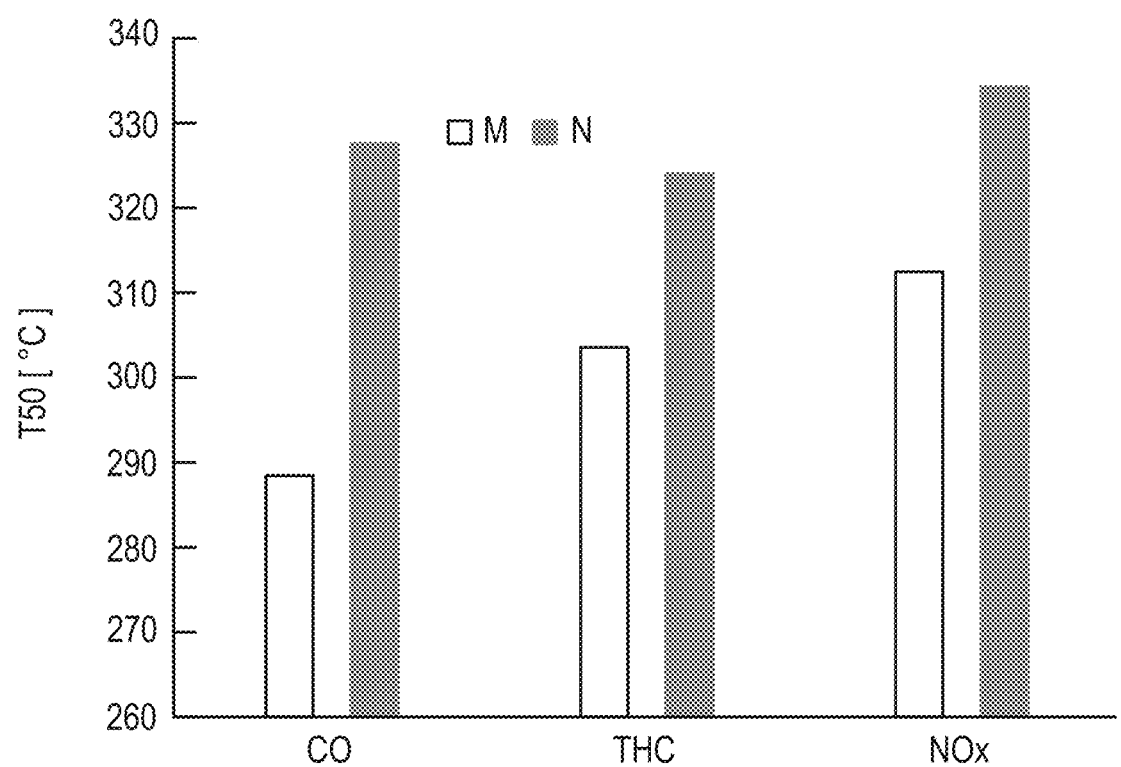
FIG. 5 is a graph showing the exhaust gas purification performance results of exhaust gas purification catalysts M and N.

The results are shown in FIG. 5. FIG. 5 shows that catalyst M of the Examples is superior in purification performance of CO, HC, and NOx as compared with the catalyst N of the Comparative Examples.

The present application is based on Japanese Patent Application No. 2020-078886 filed on Apr. 28, 2020, the disclosed content of which is incorporated by reference in its entirety.

What is claimed is:

1. A method of manufacturing a Ce—Zr composite oxide, comprising the steps of:
   mixing a cerium compound and a zirconium compound in a solvent to obtain a mixture;
   subjecting the mixture to solvothermal treatment at a temperature exceeding 250° C. to obtain a solvothermally treated product;
   subjecting the solvothermally treated product to surface stabilization treatment at a temperature of 220° C. or higher and less than 380° C. to obtain a precursor; and subjecting the precursor to structure stabilization treatment at a temperature of 380° C. or higher to generate a Ce—Zr composite oxide; wherein the solvent is at least one selected from the group consisting of alcohols and alkylene glycol monoalkyl ethers.

2. The method of manufacturing a Ce—Zr composite oxide according to claim 1, wherein the BET specific surface area of the precursor obtained by the surface stabilization treatment is 155 m²/g or more, and the ratio of the BET specific surface area of the Ce—Zr composite oxide after the structure stabilization treatment to the BET specific surface area of the precursor after the surface stabilization treatment is 0.54 or more and 1.0 or less.

3. The method according to claim 1 wherein the solvothermal treatment is performed in a closed system substituted with an inert gas.

4. The method according to claim 1, wherein the solvent is at least one of 1-4 butanediol or octanol.

5. The method according to claim 4, wherein the solvent includes 1-4 butanediol.

6. A method of manufacturing a Ce—Zr composite oxide, comprising the steps of:

mixing a cerium compound and a zirconium compound to obtain a mixture;

subjecting the mixture to solvothermal treatment at a temperature exceeding 250° C. to obtain a solvothermally treated product;

subjecting the solvothermally treated product to surface stabilization treatment at a temperature of 220° C. or higher and less than 380° C. to obtain a precursor; and subjecting the precursor to structure stabilization treatment at a temperature of 380° C. or higher to generate a Ce—Zr composite oxide, and wherein the BET specific surface area of the precursor obtained by the surface stabilization treatment is 155 m²/g or more, and the ratio of the BET specific surface area of the Ce—Zr composite oxide after the structure stabilization treatment to the BET specific surface area of the precursor after the surface stabilization treatment is 0.54 or more and 1.0 or less.

7. The method according to claim 6, wherein the solvothermal treatment is performed in a closed system substituted with an inert gas.

\* \* \* \* \*